US012803428B2

(12) United States Patent
Kim et al.

(10) Patent No.: US 12,803,428 B2
(45) Date of Patent: Nov. 17, 2026

(54) ACTIVE COMPENSATION DEVICE FOR PROVIDING ELECTROMAGNETIC WAVE NOISE DATA

(71) Applicant: EM CORETECH INC., Ulsan (KR)

(72) Inventors: Jin Gook Kim, Ulsan (KR); Sang Yeong Jeong, Ulsan (KR)

(73) Assignee: EM CORETECH INC., Ulsan (KR)

( * ) Notice: Subject to any disclaimer, the term of this patent is extended or adjusted under 35 U.S.C. 154(b) by 309 days.

(21) Appl. No.: 18/697,474

(22) PCT Filed: Sep. 30, 2022

(86) PCT No.: PCT/KR2022/014718
§ 371 (c)(1),
(2) Date: Mar. 31, 2024

(87) PCT Pub. No.: WO2023/055156
PCT Pub. Date: Apr. 6, 2023

(65) Prior Publication Data

US 2024/0405545 A1 Dec. 5, 2024

(30) Foreign Application Priority Data

Oct. 1, 2021 (KR) ........................ 10-2021-0131005
Sep. 26, 2022 (KR) ........................ 10-2022-0121638

(51) Int. Cl.
*H02M 1/44* (2007.01)
*H02M 1/12* (2006.01)

(52) U.S. Cl.
CPC ............ *H02M 1/44* (2013.01); *H02M 1/123* (2021.05)

(58) Field of Classification Search
CPC ...... H02M 1/123; H02M 1/126; H02M 1/143; H02M 1/15; H02M 1/44
See application file for complete search history.

(56) References Cited

U.S. PATENT DOCUMENTS 9,172,299 B2 * 10/2015 Hamza ................ H02M 1/4225
12,456,920 B2 * 10/2025 Kim ...................... H02M 1/123
(Continued)

FOREIGN PATENT DOCUMENTS

JP 64-051537 2/1989
JP 2011-522478 7/2011
(Continued)

OTHER PUBLICATIONS

Ji et al., Arc Welding Inverter With Embedded Digital Active EMI Controller, IEEE, 2016.
(Continued)

*Primary Examiner* — Alex Torres-Rivera
(74) *Attorney, Agent, or Firm* — PnK IP LLC

(57) ABSTRACT

The present disclosure provides an active compensation device for actively compensating for noise generated in a common mode in each of at least two high-current paths. The active compensation device includes: a sensing unit configured to generate an output signal corresponding to a common-mode noise signal on the high-current path, an IC unit that receives the output signal and converts the same into a digital signal, generates noise data and an amplified signal at least based on the digital signal, and outputs the noise data and the amplified signal, and a compensation unit that draws a compensation current from the high current path or generates a compensation voltage on the high current path, based on the amplified signal. The noise data is provided to an external device.

3 Claims, 13 Drawing Sheets

(56) References Cited

U.S. PATENT DOCUMENTS

| | | | | |
|---|---|---|---|---|
| 2014/0063872 | A1 | 3/2014 | Hamza et al. | |
| 2020/0321857 | A1* | 10/2020 | Osako | H02P 27/06 |
| 2021/0313876 | A1* | 10/2021 | Kumar | H02M 1/44 |
| 2022/0376684 | A1* | 11/2022 | Nagasawa | H02J 1/02 |
| 2025/0055368 | A1* | 2/2025 | Kim | H02M 1/123 |

FOREIGN PATENT DOCUMENTS

| | | | |
|---|---|---|---|
| KR | 10-2012-0101873 | A | 9/2012 |
| KR | 10-1285647 | B1 | 7/2013 |
| KR | 10-2015-0051422 | A | 5/2015 |
| KR | 10-2018-0053131 | A | 5/2018 |
| KR | 10-2021-0013243 | A | 2/2021 |
| KR | 10-2021-0045962 | A | 4/2021 |

OTHER PUBLICATIONS

Office Action dated Jun. 24, 2026, issued in Korean Patent Application No. 10-2024-0024700.

Narayanasamy et al., A Survey of Active EMI Filters for Conducted EMI Noise Reduction in Power Electronic Converters, IEEE Transactions On Electromagnetic Compatibility, vol. 61, No. 6, Dec. 2019.

* cited by examiner

ACTIVE COMPENSATION DEVICE FOR PROVIDING ELECTROMAGNETIC WAVE NOISE DATA

CROSS REFERENCE TO RELATED APPLICATIONS

This application is a National Stage Entry of International Patent Application No. PCT/KR2022/014718, filed on Sep. 30, 2022, which claims priority from and the benefit of Korean Patent Application No. 10-2021-0131005, filed on Oct. 1, 2021, and Korean Patent Application No. 10-2022-0121638, filed on Sep. 26, 2022, each of which is hereby incorporated by reference for all purposes as if fully set forth herein.

BACKGROUND

Field

Embodiments of the present disclosure relate to an active compensation device for compensating for a noise current and/or a noise voltage generated in a common mode on two or more high-current paths connecting two devices to each other.

Discussion of Background

In general, electrical devices such as household electrical appliances, industrial electrical appliances, or electric vehicles emit noise during operation. For example, noise may be emitted through a power line due to a switching operation of a power conversion device in an electronic device. When such noise is neglected, not only it is harmful to the human body, but also it causes malfunctions in surrounding parts and other electronic devices. As such, electromagnetic interference that an electronic device exerts on other devices is referred to as electromagnetic interference (EMI), and, in particular, noise transmitted through wires and substrate interconnections is referred to as conducted emission (CE) noise.

In order to ensure that electronic devices operate without causing malfunctions in peripheral components and other devices, the amount of EMI noise emission is strictly regulated in all electronic products. Accordingly, most of the electronic products essentially include a noise reduction device (e.g., an EMI filter) that reduces an EMI noise current, in order to satisfy regulations on the noise emission amount. For example, an EMI filter is essentially included in white goods such as an air conditioner, electric vehicles, airplanes, energy storage systems (ESSs), etc. The related-art EMI filter uses a common-mode (CM) choke to reduce CM noise among CE noise. The CM choke is a passive filter and suppresses a CM noise current.

Meanwhile, in a high-power/high-current system, the size or number of common mode chokes needs to be increased in order to prevent magnetic saturation of a CM choke and maintain noise reduction performance. Accordingly, the size and price of EMI filters for high-power products are greatly increased.

SUMMARY

Recently, in order to overcome the disadvantages of passive electromagnetic interference (EMI) filters, interest in development of active EMI filters that includes an amplifier is increasing.

However, in the case of an active EMI filter including an amplifier including an analog circuit, it is fundamentally difficult to collect information about the noise after canceling out the EMI noise.

The present disclosure is devised to address the issue described above, and an objective thereof is to provide an active compensation device that can provide EMI noise as digital data.

However, this objective is merely illustrative, and the scope of the present disclosure is not limited thereto.

An active compensation device for actively compensating for noise generated in a common mode on each of at least two high-current paths according to an embodiment of the present disclosure may include a sensing unit configured to generate an output signal corresponding to a common-mode noise signal on the high-current path, an integrated circuit (IC) unit that receives the output signal and converts the same into a digital signal, generates noise data and an amplified signal at least based on the digital signal, and outputs the noise data and the amplified signal, and a compensation unit configured to draw a compensation current out of the high-current path or generate a compensation voltage on the high-current path, based on the amplified signal, wherein the noise data may be provided to an external device.

According to an embodiment, the IC unit may restore the digital signal to an analog signal, amplify the analog signal to generate the amplified signal, and output the amplified signal through a first output terminal.

According to an embodiment, the IC unit may include an analog-to-digital converter, and an input buffer configured to receive the output signal and attenuate the output signal into a low-voltage analog signal that is usable for the analog-to-digital converter.

According to an embodiment, the analog-to-digital converter may include a converter circuit that generates the digital signal from the low-voltage analog signal, and a component that processes and outputs the digital signal to reduce defects in the noise data.

According to an embodiment, the IC unit may further include a digital-to-analog converter that receives the digital signal and restores the same into an analog signal, and a voltage-controlled oscillator configured to generate by itself a clock signal for controlling an internal circuit of the analog-to-digital converter.

According to an embodiment, the IC unit may consist of a single IC chip, and The single IC chip may include an input terminal to receive the output signal of the sensing unit as an input, a first output terminal to output the amplified signal, and second output terminals to output the noise data.

Other aspects, features, and advantages other than those described above will be apparent from the following drawings, claims, and detailed description.

According to various embodiments of the present disclosure as described above, electromagnetic interference (EMI) noise data can be collected while canceling the EMI noise by using an active EMI filter.

According to various embodiments of the present disclosure, noise data may be extracted and collected from an active EMI filter, and used for various purposes. For example, noise data output from an active EMI filter according to an embodiment of the present disclosure can be monitored to identify a change in state or an emergency situation. Also, the noise data can be utilized for big data processing.

In some embodiments, the scope of the present disclosure is not limited by these effects.

DETAILED DESCRIPTION

Figure 1:
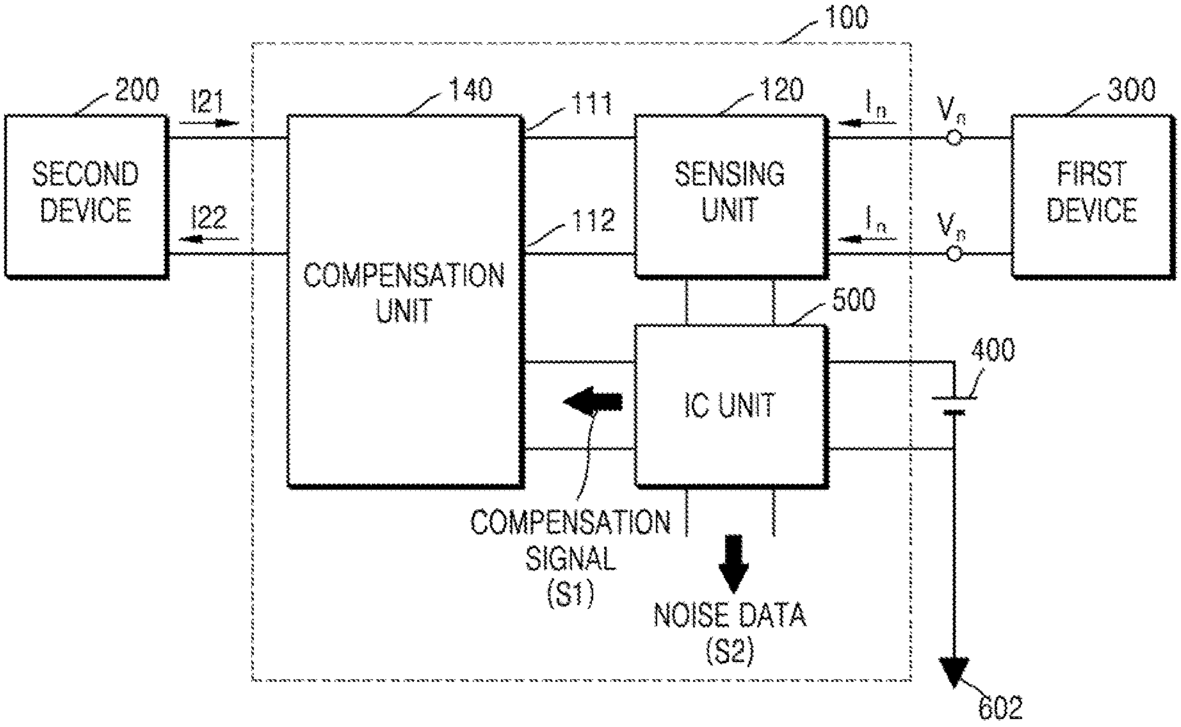
FIG. 1 schematically illustrates a configuration of a system including an active compensation device 100 according to an embodiment of the present disclosure.

An active compensation device for actively compensating for noise generated in a common mode on each of at least two high-current paths according to an embodiment of the present disclosure may include: a sensing unit configured to generate an output signal corresponding to a common-mode noise signal on the high-current path; an integrated circuit (IC) unit that receives the output signal and converts the same into a digital signal, generates noise data and an amplified signal at least based on the digital signal, and outputs the noise data and the amplified signal; and a compensation unit configured to draw a compensation current out of the high-current path or generate a compensation voltage on the high-current path, based on the amplified signal, wherein the noise data may be provided to an external device.

As the present disclosure allows for various changes and numerous embodiments, particular embodiments will be illustrated in the drawings and described in detail. The effects and features of the present disclosure and methods of achieving them will become clear with reference to the embodiments described in detail below with the drawings. However, the present disclosure is not limited to the embodiments disclosed below, and may be implemented in various forms.

Hereinafter, embodiments of the present disclosure will be described in detail with reference to the accompanying drawings, and the same or corresponding components will be denoted by the same reference numerals when described with reference to the accompanying drawings, and thus, their descriptions that are already provided will be omitted.

In the following embodiments, terms such as "first," "second," etc., are used only to distinguish one component from another, and such components must not be limited by these terms.

In the following embodiments, the singular expression also includes the plural meaning as long as it is not inconsistent with the context.

In the following embodiments, the terms "comprises," "includes," "has", and the like used herein specify the presence of stated features or components, but do not preclude the presence or addition of one or more other features or components.

For convenience of description, the magnitude of components in the drawings may be exaggerated or reduced. For example, each component in the drawings is illustrated to have an arbitrary size and thickness for ease of description, and thus the present disclosure is not limited to the drawings.

In the following embodiments, when a component, unit, block, or module is referred to as being connected to another component, unit, block, or module, they may be directly connected to each other, or may be indirectly connected to each other with still another component, unit, block, or module therebetween.

FIG. 1 schematically illustrates a configuration of a system including an active compensation device 100 according to an embodiment of the present disclosure. The active compensation device 100 may actively compensate for noise currents $I_n$ (e.g., electromagnetic interference (EMI) noise currents) and/or a noise voltage (e.g., an EMI noise voltage) generated in a common mode (CM) on two or more high-current paths 111 and 112 from a first device 300.

Referring to FIG. 1, the active compensation device 100 may include a sensing unit 120, an integrated circuit (IC) unit 500, and a compensation unit 140.

In some embodiments, the first device 300 may be various types of devices using power supplied by a second device 200. For example, the first device 300 may be a load driven by using power supplied by the second device 200. In addition, the first device 300 may be a load (e.g., an electric vehicle) that stores energy by using power supplied by the second device 200 and is driven by using the stored energy. However, the present disclosure is not limited thereto.

In some embodiments, the second device 200 may be various types of devices for supplying power to the first device 300 in the form of current and/or voltage. For example, the second device 200 may be a device for generating and supplying power or may be a device for supplying power generated by another device (e.g., an electric vehicle charging device). In some embodiments, the second device 200 may also be a device for supplying stored energy. However, the present disclosure is not limited thereto. A power conversion device may be located on the side of the first device 300. For example, the CM noise currents $I_n$ may be generated on the high-current paths 111 and 112 by a switching operation of the power conversion device. Alternatively, for example, a noise current leaked from the side of the first device 300 may flow into the high-current paths 111 and 112 through the second device 200 via the ground (e.g., reference potential 1), and thus, the noise currents $I_n$ may be generated.

The noise currents $I_n$ generated in the same direction on the high-current paths 111 and 112 may be referred to as CM noise currents. In addition, a CM noise voltage $V_n$ may refer to a voltage generated between the ground (e.g., reference potential 1) and the high-current paths 111 and 112, rather than a voltage generated between the high-current paths 111 and 112.

For example, the side of the first device 300 may correspond to a noise source, and the side of the second device 200 may correspond to a noise receiver.

The two or more high-current paths 111 and 112 may be paths that transfer power supplied by the second device 200, i.e., the high currents I21 and I22, to the first device 300, and may be, for example, power lines. For example, the two or more high-current paths 111 and 112 may be a live line and a neutral line, respectively. At least portions of the high-current paths 111 and 112 may pass through the compensation device 100. High currents I21 and I22 may be alternating currents having a frequency of a second frequency band. The second frequency band may be, for example, between 50 Hz and 60 Hz.

In addition, the two or more high-current paths 111 and 112 may be paths through which the noise currents $I_n$ are transferred from the first device 300 to the second device 200. Alternatively, the two or more high-current paths 111 and 112 may be paths where the noise voltage Vn is generated with respect to the ground (e.g., reference potential 1).

The noise currents $I_n$ or the noise voltage $V_n$ may be input in a CM to each of the two or more high-current paths 111 and 112. The noise currents $I_n$ may be a current unintentionally generated in the first device 300 due to various causes. For example, the noise currents $I_n$ may be a noise current due to a parasitic capacitance between the first device 300 and the surrounding environment. Alternatively, the noise currents $I_n$ may be a noise current generated by a switching operation of a power conversion device of the first device 300. The noise currents $I_n$ and the noise voltage $V_n$ may have a frequency of a first frequency band. The first frequency band may be higher than the second frequency band. The first frequency band may be, for example, between 150 KHz and 30 MHz.

Although the drawings illustrate that the noise currents $I_n$ and the noise voltage $V_n$ are at nodes on the high-current paths 111 and 112 between the first device 300 and the sensing unit 120, the terms 'noise current' and 'noise voltage' as used herein are not limited thereto and may respectively refer to a voltage and a current that may be generated in a CM with the first frequency throughout the high-current paths 111 and 112.

Meanwhile, the two or more high-current paths 111 and 112 may include two paths as illustrated in FIG. 1, and may also include three paths (e.g., a three-phase three-wire power system), or four paths (e.g., a three-phase four-wire power system). The number of high-current paths 111 and 112 may vary depending on the type and/or form of power used by the first device 300 and/or the second device 200.

The sensing unit 120 may sense the noise currents $I_n$ on the two or more high-current paths 111 and 112 and generate an output signal corresponding to the noise currents $I_n$, toward the IC unit 500. That is, the sensing unit 120 may refer to a unit configured to sense the noise currents $I_n$ on the high-current paths 111 and 112. Although at least portions of the high-current paths 111 and 112 may pass through the sensing unit 120 to sense the noise currents $I_n$, a portion of the sensing unit 120 where the output signal is generated by the sensing may be insulated from the high current paths 111 and 112. For example, the sensing unit 120 may be implemented as a sensing transformer. The sensing transformer may sense the noise currents $I_n$ on the high-current paths 111 and 112 while being insulated from the high-current paths 111 and 112.

The IC unit 500 may be electrically connected to the sensing unit 120 to generate a compensation signal S1 corresponding to an amplified signal of the output signal output by the sensing unit 120, and also generate noise data S2 corresponding to a digital signal of the output signal. In the present disclosure, 'amplification' may refer to adjusting the magnitude and/or phase of a target to be amplified. The IC unit 500 may be implemented by various units and may include an active element.

According to various embodiments of the present disclosure, the IC unit 500 may output the compensation signal S1 for canceling noise to the compensation unit 140, and output the digital data S2 representing the noise to the outside.

In various embodiments of the present disclosure, the IC unit 500 may include a circuit configured to convert an output signal (i.e., a signal corresponding to noise) output from the sensing unit 120 into a digital signal. In various embodiments, the IC unit 500 may output the noise data generated based on the digital signal to the outside. In some embodiments, the IC unit 500 may convert the digital signal back into an analog signal and amplify the same, and output the amplified signal to the compensation unit 140 as a compensation signal S1. An example of the detailed configuration of the IC unit 500 will be described below with reference to FIGS. 3 to 7.

For example, the noise data S2 output from the active compensation device 100 may be transferred to and stored in a data storage, or may be transferred to a waveform display device. For example, the noise data S2 may be monitored to identify a change in state or an emergency situation. The noise data S2 may be used for big data processing or artificial intelligence technology.

Meanwhile, the IC unit 500 may receive power supplied from a third device 400 separate from the first device 300 and/or the second device 200, amplify an output signal output by the sensing unit 120 to generate an amplified current/voltage as the compensation signal S1, and generate the noise data S2 based on the output signal. Here, the third device 400 may be a device for receiving power from a power source separate from the first device 300 and the second device 200 to generate input power of the IC unit 500. Optionally, the third device 400 may be a device for receiving power from any one of the first device 300 and the second device 200 to generate input power of the IC unit 500.

The IC unit 500 may output an amplified voltage or an amplified current as the compensation signal S1 to the side of the compensation unit 140. The compensation signal S1 is input to the compensation unit 140. The compensation unit 140 may generate a compensation voltage or a compensation current based on the input compensation signal (the amplified voltage or amplified current).

According to an embodiment, the compensation unit 140 may generate compensation voltages in series on the high-current paths 111 and 112 based on the amplified voltage output from the IC unit 500. An output side of the compensation unit 140 may generate the compensation voltages in series on the high-current paths 111 and 112, but may be insulated from the IC unit 500. For example, the compensation unit 140 may be implemented as a compensation transformer for the insulation. For example, a compensation signal output from the IC unit 500 may be applied to a primary side of the compensation transformer, and a compensation voltage based on the compensation signal may be generated on a secondary side of the compensation transformer. The compensation voltage may have an effect of suppressing the noise currents $I_n$ flowing through the high-current paths 111 and 112. In this case, the compensation unit 140 may correspond to voltage compensation. The voltage compensation will be described in detail below with reference to FIGS. 2, 8, and 11.

According to another embodiment, the compensation unit 140 may generate a compensation current based on the amplified current output from the IC unit 500. The compensation current may be injected into or drawn out of the high-current paths 111 and 112 to cancel or reduce the noise currents $I_n$ on the high-current paths 111 and 112. In this case, the compensation unit 140 may correspond to current compensation. A detailed description of current compensation is provided later with reference to FIGS. 9, 10, and 11. Meanwhile, the output side of the compensation unit 140 may be connected to the high-current paths 111 and 112 to allow the compensation current to flow to the high-current paths 111 and 112, but may be insulated from the IC unit 500. For example, the compensation unit 140 may include a compensation transformer for the insulation.

The compensation unit 140 may be of a feedforward type that compensates for noise input from the side of the first device 300 at a front end thereof, which is a power source side. However, the present disclosure is not limited thereto, and the active compensation device 100 may include a feedback-type compensation unit that compensates for noise at a rear end thereof (see FIG. 10).

Figure 2:
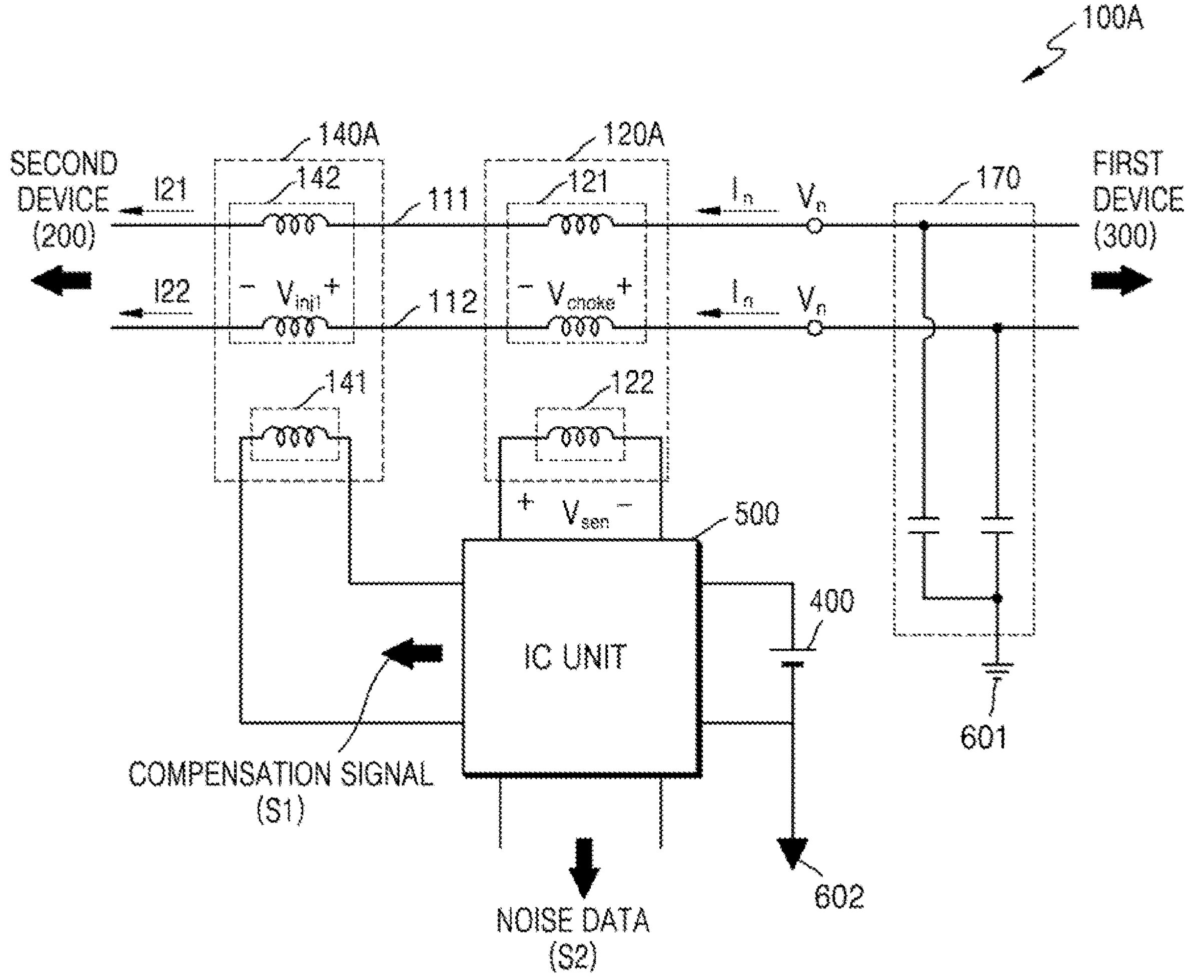
FIG. 2 illustrates a more detailed example of the embodiment illustrated in FIG. 1, and schematically illustrates an active compensation device 100A according to an embodiment of the present disclosure.

FIG. 2 illustrates a more detailed example of the embodiment illustrated in FIG. 1, and schematically illustrates an active compensation device 100A according to an embodiment of the present disclosure. The active compensation device 100A may include a sensing unit 120A, the IC unit 500, and a compensation unit 140A.

In FIG. 2 and the drawings below, the first device 300 and the second device 200 may be omitted. That is, the high-current paths 111 and 112 at the front end of the active compensation device 100A (e.g., the side of the compensation unit 140A) may be connected to a power line of the second device 200, and the high-current paths 111 and 112 at the rear end (e.g., the side of the sensing unit 120A) thereof may be connected to a power line of the first device 300.

According to an embodiment, the sensing unit 120 may include a sensing transformer 120A.

The sensing transformer 120A may be a unit for sensing noise currents $I_n$ on the high current paths 111 and 112 while being insulated from the high current path 111 and 112, or a voltage (e.g., $V_{choke}$) induced in both ends of the sensing transformer 120A due to the noise current $I_n$.

The sensing transformer 120A may include a primary side 121 arranged on the high-current paths 111 and 112, and a secondary side 122 connected to an input terminal of the IC unit 500. The sensing transformer 120A may generate an induced current or an induced voltage $V_{sen}$ directed to the secondary side 122 (e.g., a secondary winding) based on magnetic flux densities induced due to the noise currents $I_n$, at the primary side 121 (e.g., a primary winding) arranged on the high-current paths 111 and 112. The primary side 121 of the sensing transformer 120A may be, for example, a winding in which each of the first high-current path 111 and the second high-current path 112 is wound around one core.

In detail, the sensing transformer 120A may be configured such that the magnetic flux density induced due to the noise current $I_n$ on the first high-current path 111 (e.g., a live line) and the magnetic flux density induced due to the noise current $I_n$ on the second high-current path 112 (e.g., a neutral line) are overlapped (or reinforced) with each other. Here, the high currents I21 and I22 also flow through the high-current paths 111 and 112, and thus, the sensing transformer 120A may be configured such that a magnetic flux density induced due to the high current I21 on the first high-current path 111 and a magnetic flux density induced due to the high current I22 on the second high-current path 112 cancel each other. In addition, for example, the sensing transformer 120A may be configured such that magnitudes of the magnetic flux densities, which are induced due to the noise currents $I_n$ of the first frequency band (e.g., a band between 150 KHz and 30 MHz), are greater than magnitudes of the magnetic flux densities induced due to the high currents I21 and I22 of the second frequency band (e.g., a band between 50 Hz and 60 Hz).

As described above, the sensing transformer 120A may be configured such that the magnetic flux densities induced due to the high currents I21 and I22 may cancel each other and thus only the noise currents $I_n$ may be sensed. That is, the voltage $V_{sen}$ induced in the secondary side 122 of the sensing transformer 120A may be a voltage into which the induced voltage (e.g., $V_{choke}$) in the primary side 121 according to the noise current $I_n$ is converted at a preset ratio.

The IC unit 500 may amplify the induced voltage $V_{sen}$ induced in the secondary side of the sensing transformer (120A) and output the same as a compensation signal S1. In some embodiments, the IC unit 500 may output noise data S2 based on the induced voltage $V_{sen}$. An example of the detailed configuration of the IC unit 500 will be described below with reference to FIGS. 3 to 7.

According to an embodiment, the compensation unit 140 may include a compensation transformer 140A.

The compensation transformer 140A may insulate the IC unit 500 including the active element from the high-current paths 111 and 112. The compensation transformer 140A may be a unit for performing voltage compensation by inducing a compensation voltage $V_{inj1}$ in the high-current paths 111 and 112 based on the compensation signal S1 output from the IC unit 500, while being insulated from the high-current paths 111 and 112.

The compensation transformer 140A may have, for example, a structure in which a wire of a primary side 141 and a wire of a secondary side 142 pass through one core or are wound around one core at least once. The wire of the primary side 141 may be through which the compensation signal S1 output from the IC unit 500 flows, and the wire of the secondary side 142 may correspond to the high-current paths 111 and 112.

The compensation transformer 140A may induce the compensation voltage $V_{inj1}$ on the high-current paths 111 and 112, which are on the secondary side 142, based on an amplified voltage generated in the primary side 141.

Meanwhile, the active compensation device 100A according to an embodiment of the present disclosure may further include a decoupling capacitor unit 170.

The decoupling capacitor unit 170 may be arranged, for example, between the sensing unit 120 and the first device 300, and may include two Y-capacitors each having one end connected to reference potential 1 601 and another end connected to the high-current paths 111 and 112.

Meanwhile, the reference potential of the IC unit 500 (reference potential 2, 602) and the reference potential of the compensation device 100A (reference potential 1, 601) may be different potentials.

Figure 3:
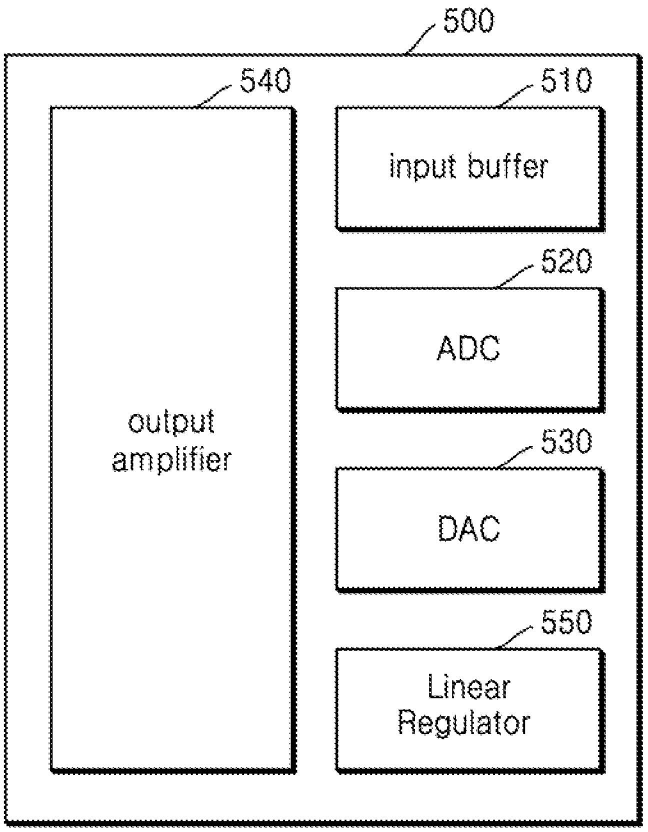
FIGS. 3 and 4 show a specific example of an IC unit 500 according to various embodiments of the present disclosure.
Figure 4:
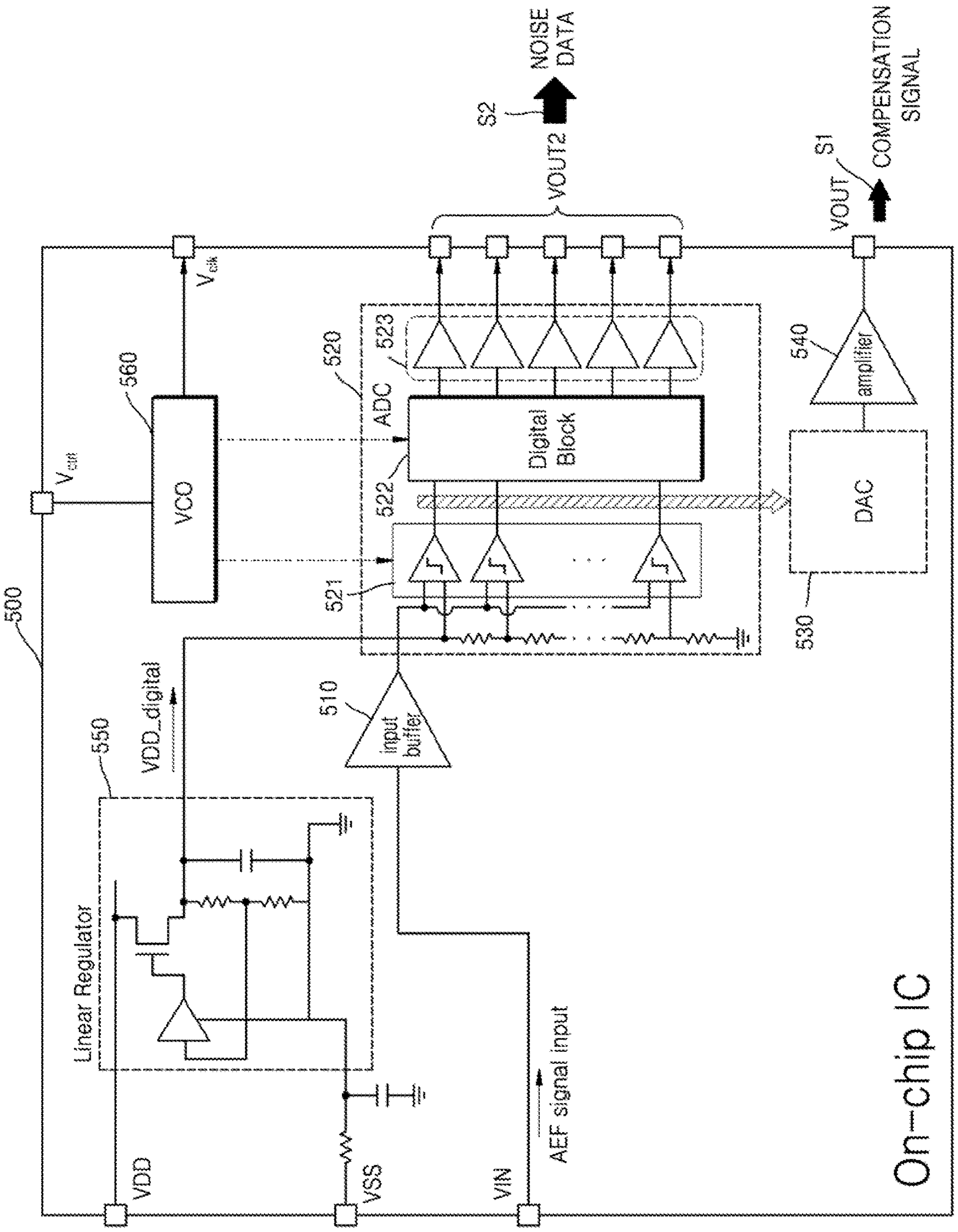

FIGS. 3 and 4 show a specific example of the IC unit 500 according to various embodiments of the present disclosure.

Referring to FIG. 3, the IC unit 500 according to an embodiment of the present disclosure may include an input buffer 510, an analog-to-digital converter (ADC) 520, a digital-to-analog converter 530, an output amplifier 540, and a linear regulator 550.

FIG. 4 shows respective components of the IC unit 500 according to an embodiment of the present disclosure in more detail.

Referring to FIGS. 3 and 4 together, the IC unit 500 may physically be one IC chip. According to the present embodiment, the digital noise data and the compensation signal as described above may be generated from one IC chip. In other words, a component (e.g., a circuit) that generates noise data and a component that generates a compensation signal may be implemented on one IC chip. However, this is only an embodiment, and in another embodiment, a component for generating noise data and a component for generating a compensation signal may be implemented on one or more different chips or packages.

The IC unit 500 may include an input terminal VIN for receiving an output signal of the sensing unit 120, a first output terminal VOUT for outputting a compensation signal, and second output terminals VOUT2 for outputting digital noise data.

As described above, the sensing unit 120 may sense a noise signal ($I_n$ or $V_n$) to generate an output signal corresponding to the noise signal. An output signal output from the sensing unit 120 serves as an input signal of the IC unit 500.

The output signal of the sensing unit 120 may be input to the input buffer 510 through the input terminal VIN of the IC unit 500. The input signal of the input buffer 510 may correspond to a noise signal.

In an embodiment, the input noise signal of the input buffer 510 may have a high voltage swing of at least 10 V. Thus, for example, the input buffer 510 may be a high-swing double-diffused metal oxide semiconductor (DMOS) having a sufficient breakdown voltage and performance.

Figure 6:
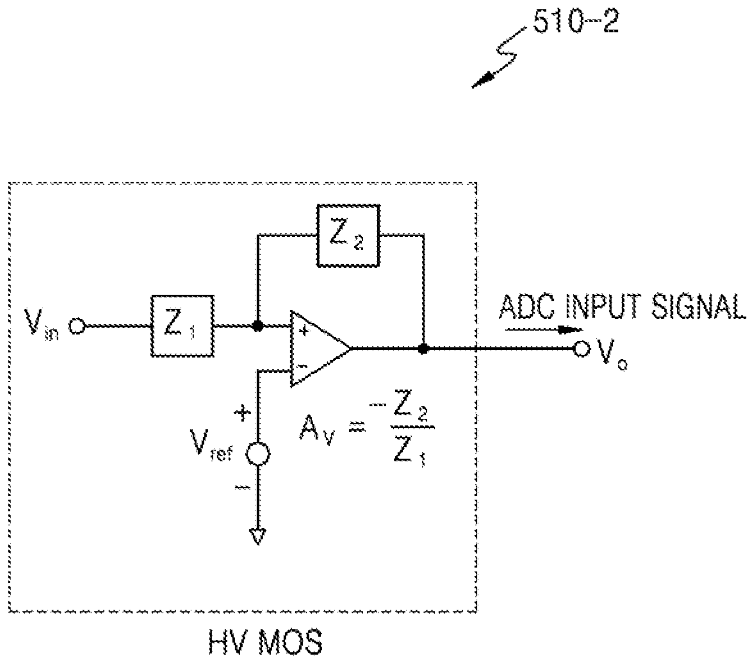
FIG. 6 illustrates an input buffer 510-2 as another example of the input buffer 510 in an embodiment.

FIG. 4 illustrates an input buffer 510-1 as an example of the input buffer 510 in an embodiment, and FIG. 6 illustrates an input buffer 510-2 as another example of the input buffer 510 in an embodiment. Hereinafter, descriptions of the input buffer 510 may include all descriptions of the input buffers 510, 510-1, and 510-2.

Because the input noise signal may be a high-voltage signal of at least 10 V, the input buffers 510, 510-1 and 510-2 may be high-voltage (HV) input buffers. For example, a target breakdown voltage of the input buffer 510 may be 12 V, the input impedance may be 100 kohm or greater, and the bandwidth (BW) may correspond to about 30 Mhz. However, the present disclosure is not limited thereto.

The input buffer 510 may serve as an attenuator that minimizes distortion of an input signal and attenuates the input signal into a low-voltage analog signal suitable for the ADC 520. In other words, for example, the input buffer 510 may reduce the amplitude of the input noise signal and output the input noise signal to the ADC 520.

Figure 5:
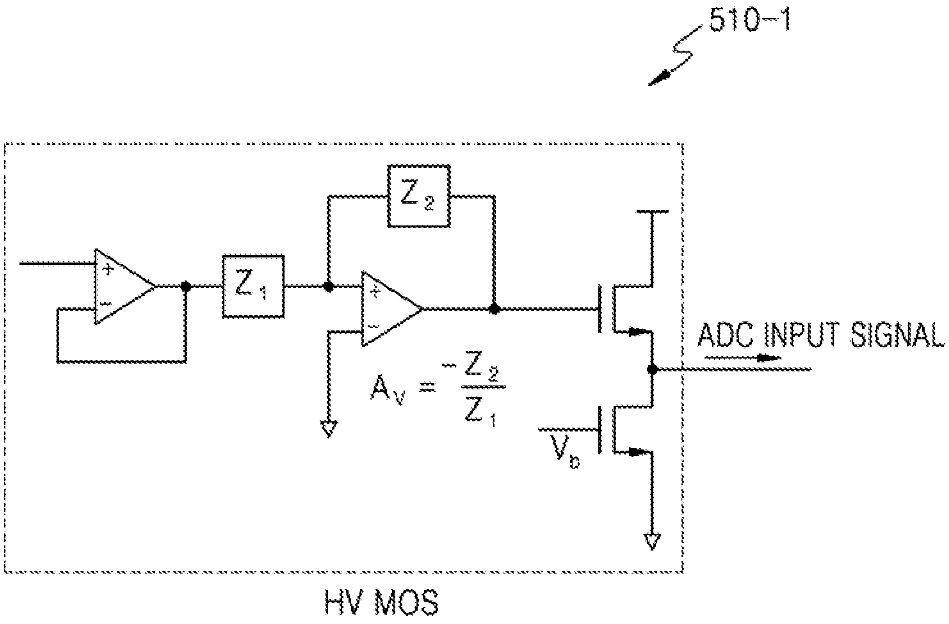
FIG. 5 illustrates an input buffer 510-1 as an example of an input buffer 510 in an embodiment.

In an embodiment, as illustrated in FIG. 5, the input buffer 510-1 may include multi-stage amplifiers, and in another embodiment, as illustrated in FIG. 6, the input buffer 510-2 may include a one-stage inverting amplifier.

For example, in the input buffer 510-2, when an input signal is $V_{in}$, an output signal $V_o$ may be expressed as Equation 1 below.

$$V_o \approx V_{ref} - \frac{Z_2}{Z_1}(V_{in} - V_{ref}) \qquad \text{[Equation 1]}$$

Meanwhile, the attenuation signal output from the input buffer 510 may be input to the analog-to-digital converter (ADC) 520. The attenuation signal input to the ADC 520 may correspond to an EMI noise signal. Here, 'corresponding' may mean that the magnitude of the EMI noise signal is changed at a preset rate, but is not limited thereto.

The ADC 520 may receive the attenuation signal, convert the attenuation signal into a digital signal, and output digital noise data S2 based on the digital signal. In some embodiments, the digital signal may be transmitted to the digital-to-analog converter 530 and used to generate a compensation signal S1.

Figure 7:
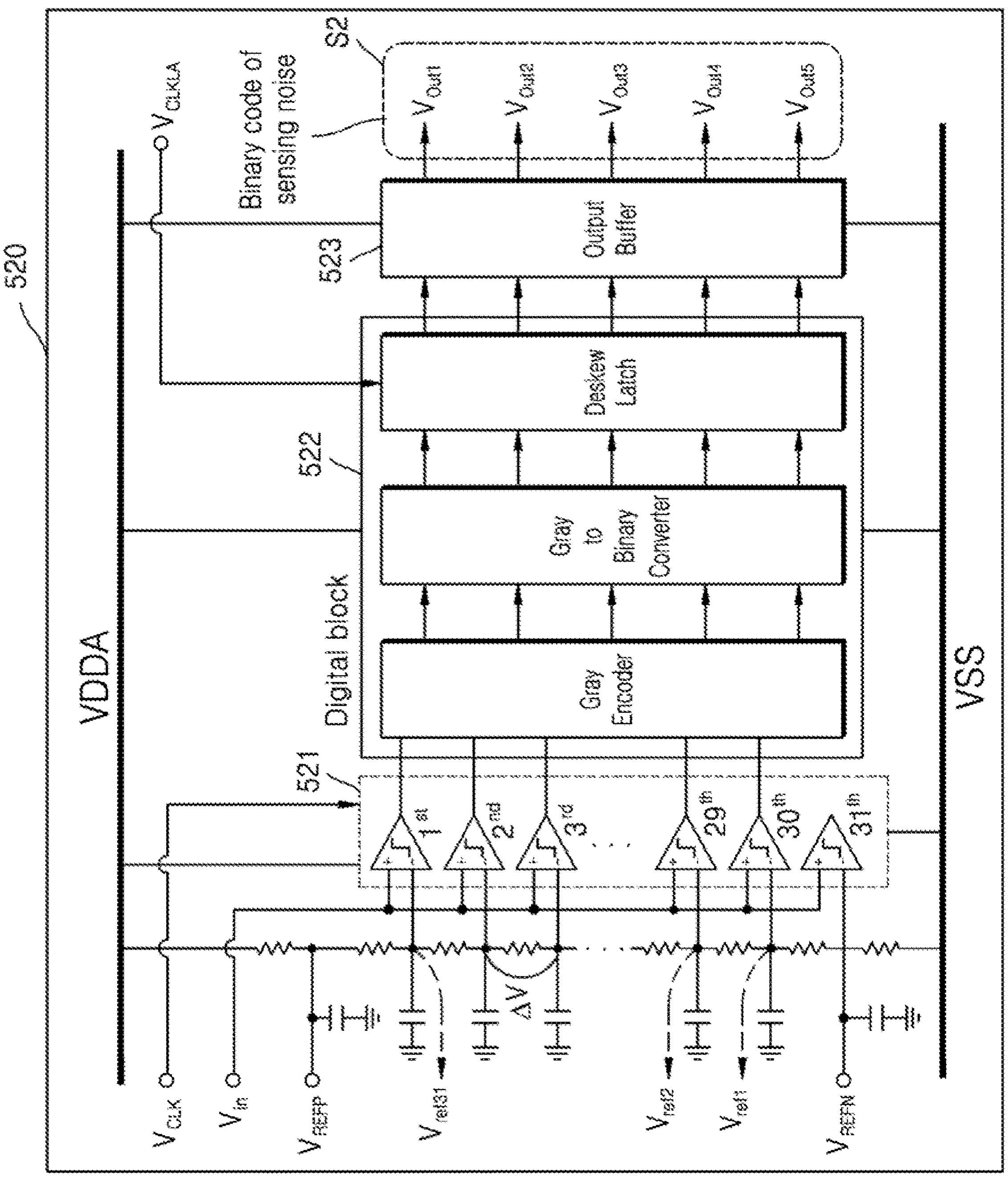
FIG. 7 illustrates an example of an analog-to-digital converter 520 in an embodiment.

FIG. 7 illustrates an example of the analog-to-digital converter 520 in an embodiment. According to an embodiment, the ADC 520 may include a converter circuit 521, a digital block 522, and/or an output buffer 523.

The converter circuit 521 may be referred to as a data processing core of the ADC 520. For example, a converter circuit 521 may be configured as a flash ADC as illustrated in FIG. 7. The flash ADC may output a digital signal in the form of a thermometer code according to the magnitude of the input analog signal. In an embodiment, a digital signal in the form of a thermometer code may be transmitted to the DAC 530 and may be the basis for generating the compensation signal S1 (see FIG. 4).

However, the converter circuit 521 is not limited to the flash ADC, and may include, for example, a successive-approximation register (SAR) ADC or a sigma-delta ADC, and may be configured as other types of ADCs.

The converter circuit 521 may generate a digital signal from an input low-voltage analog signal. The digital signal generated by the converter circuit 521 may be transmitted to the DAC 530 and may be the basis for generating the compensation signal S1 (see FIG. 4).

Meanwhile, the digital signal output from the converter circuit 521 may be input to the digital block 522. The digital block 522 may include, for example, a gray encoder, a gray-to-binary converter, and/or a deskew latch, and thus may generate a binary code that minimizes glitches.

For example, the digital block 522 may be a component that processes the digital signal output from the converter circuit 521 to minimize glitches of the digital noise data S2.

The signal output from the digital block 522 may be output through the output buffer 523 as the digital noise data S2 in the form of a binary code representing noise. The noise data S2 may be output as a 5-bit signal, but is not limited thereto. According to an embodiment, the noise data S2 may be output as an 8-bit to 10-bit signal, or a signal with any number of bits.

The noise data S2 may be output to the outside of the active compensation device 100 through the second output terminals VOUT2. The second output terminals VOUT2 may be connected to an external device such as a data storage or a waveform display device. The noise data S2 output to the outside of the active compensation device 100 may be monitored to identify a change in state or an emergency situation. The noise data S2 may be used for big data processing or artificial intelligence technology.

Meanwhile, in an embodiment, a target input voltage level of the analog-to-digital converter 520 may be designed to correspond to 0.3 V to 1.3 V, and the switching frequency may be designed to correspond to about 800 Mhz. However, the present disclosure is not limited thereto. When the target input voltage level is designed to be 0.3 V to 1.3 V, in FIG. 7, $V_{REFN}$ may correspond to 0.3 V and $V_{REFP}$ may correspond to 1.3 V. In addition, in an embodiment, VDDA may be designed to correspond to about 1.8 V, but is not limited thereto.

Referring again to FIG. 4, the digital signal generated by the analog-to-digital converter 520 may be transmitted to the digital-to-analog converter 530 to generate a compensation signal S1. The digital signal may be in the form of a thermometer code, for example. The digital-to-analog converter 530 may convert the digital signal into an analog signal and output the converted analog signal to the output amplifier 540.

The output amplifier 540 may receive and amplify the analog signal. The amplified signal may be output as the compensation signal S1 through the first output terminal VOUT. The compensation signal S1 output through the first output terminal VOUT may be input to the compensation unit 140.

Meanwhile, since the compensation signal S1 must be sufficiently large, the output amplifier 540 may be designed as a high-voltage (HV) DMOS. For example, the switching frequency of the DAC 530 may be designed to correspond to about 800 Mhz, the output voltage of the output amplifier 540 may be designed to correspond to about 12 V, and the output current of the output amplifier 540 may be designed to correspond to about 1 V. However, embodiments of the present disclosure are not disclosed herein.

The IC unit 500 may further include a voltage controlled oscillator (VCO) 560. The VCO 560 may generate a clock signal whose frequency varies depending on an input voltage. The VCO 560 may be embedded in the IC unit 500 such that the active compensation device 100 generates a clock signal by itself without an external clock generator.

For example, the VCO 560 may receive an input voltage from the outside (e.g., the third device 400) through a terminal Vctrl of the IC unit 500. The clock signal generated by the VCO 560 may be transferred to the ADC 520 to be used to control internal circuits.

The linear regulator 550 may generate a DC low voltage for driving the internal circuits of the IC unit 500, such as the ADC 520 and the VCO 560. For example, the linear regulator 550 may receive an input voltage of about 12 V from the outside (e.g., the third device 400) through terminals VSS and VDD of the IC unit 500 and output a DC low voltage of about 1.8 V. However, the present disclosure is not limited thereto. The DC low voltage may be used to drive the internal circuits of the IC unit 500, such as the ADC 520 and the VCO 560.

Figure 8:
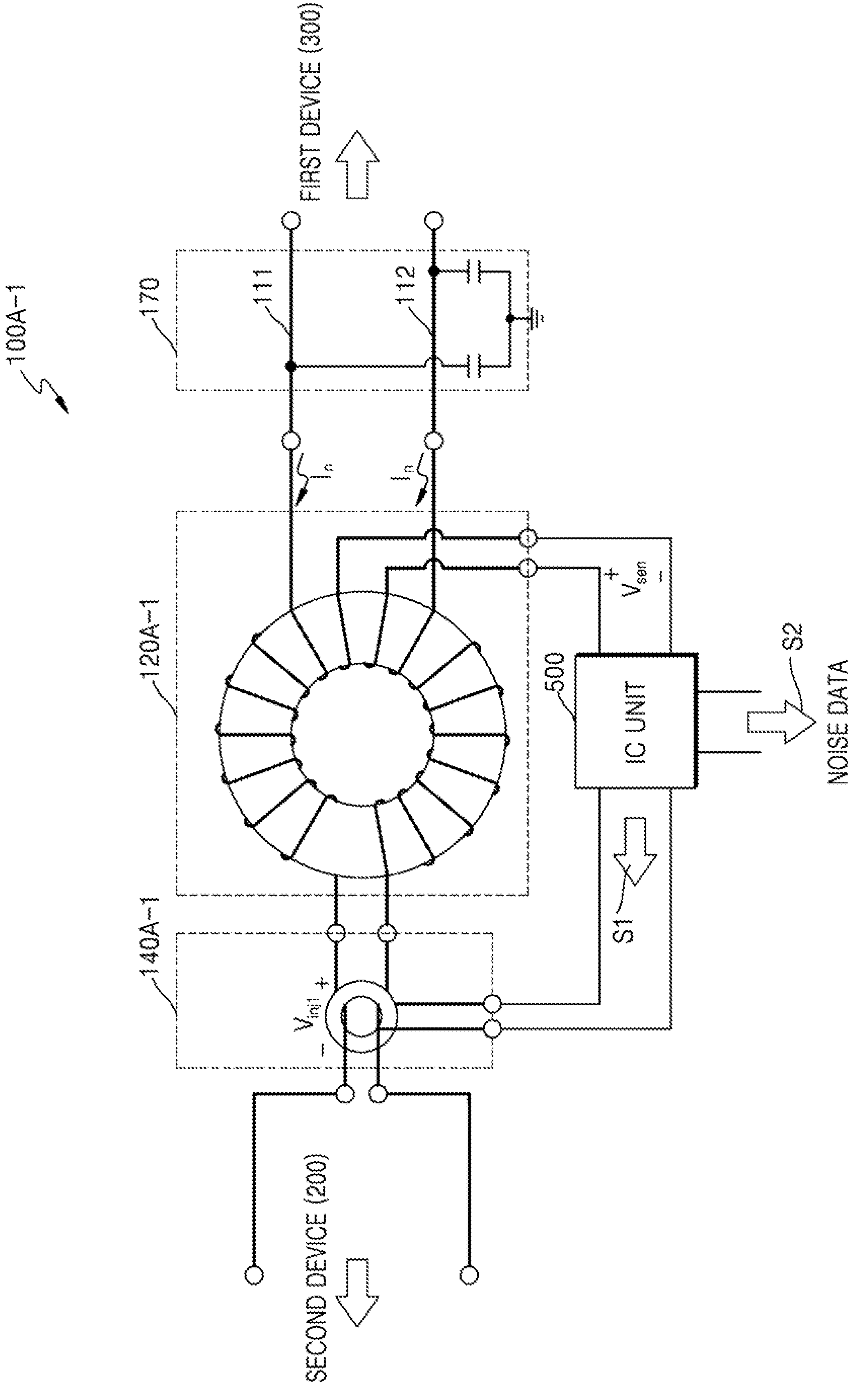
FIG. 8 illustrates a more detailed example of the embodiment illustrated in FIG. 2, and schematically illustrates an active compensation device 100A-1 according to an embodiment of the present disclosure.

FIG. 8 illustrates a more detailed example of the embodiment illustrated in FIG. 2, and schematically illustrates an active compensation device 100A-1 according to an embodiment of the present disclosure. In FIG. 8, the third device 400 is omitted for convenience.

Referring to FIG. 8, the active compensation device 100A-1 may include a sensing unit 120A-1, the IC unit 500, and a compensation transformer 140A-1. The sensing unit 120A-1, the IC unit 500, and the compensation transformer 140A-1 are examples of the sensing units 120 and 120A, the IC unit 500, and the compensation units 140 and 140A described above, respectively.

The active compensation device 100A-1 may sense the noise current $I_n$ input in a CM to each of two high-current paths 111 and 112 connected to the first device 300, and actively compensate for the noise current $I_n$ with the compensation voltage $V_{inj1}$.

The sensing unit 120A-1 may be, for example, a sensing transformer in which a secondary side wire is wound around a CM choke around which power lines corresponding to the high-current paths 111 and 112 are wound. The secondary side wire may be connected to the input terminal VIN of the IC unit 500.

When the sensing unit 120A-1 is formed by using the CM choke as described above, the sensing unit 120A-1 may serve as a passive filter with the CM choke, as well as performing functions of sensing and transforming. That is, the sensing transformer formed by additionally winding the secondary side wire around the CM choke may simultaneously function to suppress or block the noise currents $I_n$ along with sensing and transforming the noise currents $I_n$.

Meanwhile, the output signal $V_{sen}$ of the sensing unit 120A-1 may be input to the IC unit 500. As described above, the IC unit 500 converts the output signal $V_{sen}$ into a digital signal, generates and outputs noise data S2 based on the digital signal, and generates a compensation signal (or An amplified signal) S1 can be output.

The noise data S2 may be stored in a data storage external to the active compensation device 100A-1, and utilized.

The compensation signal S1 may correspond to an input voltage of the compensation transformer 140A-1. The compensation transformer 140A-1 may induce the compensation voltage $V_{inj1}$ in series on the high-current paths 111 and 112, which are on the secondary side, based on the input voltage applied to the primary side. The compensation voltage $V_{inj1}$ generated in series on the high-current paths 111 and 112 may have an effect of suppressing the noise currents $I_n$ flowing through the high-current paths 111 and 112.

The active compensation device 100A-1 described above is an example of a current-sensing voltage-compensating (CSVC) type that senses the noise currents $I_n$ and compensates for the noise currents $I_n$ with the compensation voltage $V_{inj1}$.

Figure 9:
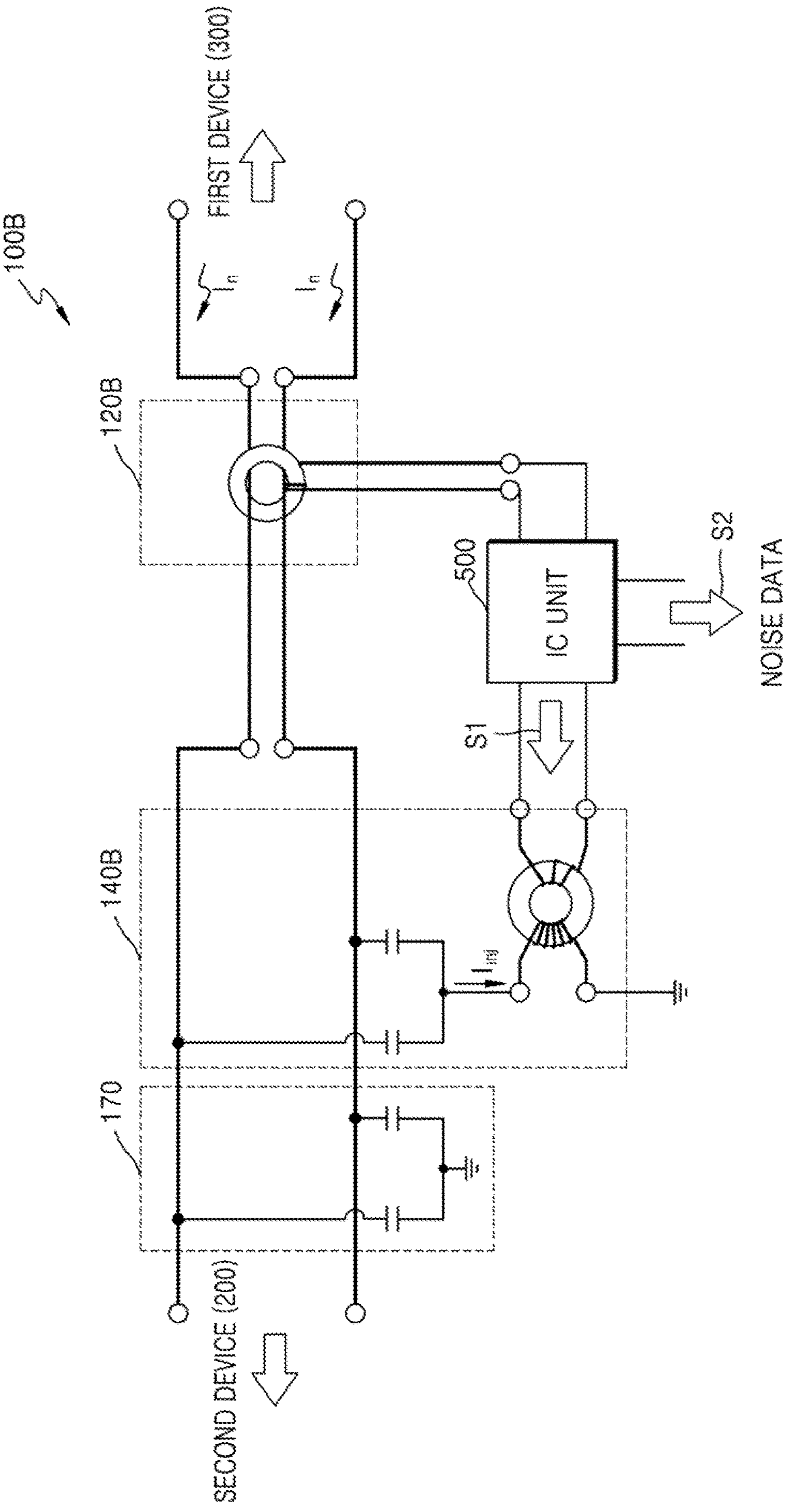
FIG. 9 illustrates a more detailed example of the embodiment illustrated in FIG. 1, and schematically illustrates an active compensation device 100B according to an embodiment of the present disclosure.

FIG. 9 illustrates a more detailed example of the embodiment illustrated in FIG. 1, and schematically illustrates an active compensation device 100B according to an embodiment of the present disclosure. In FIG. 9, the third device 400 is omitted for convenience.

Referring to FIG. 9, the active compensation device 100B may include a sensing transformer 120B, the IC unit 500, and a compensation unit 140B. The sensing transformer 120B, the IC unit 500, and the compensation unit 140B are examples of the sensing units 120 and 120A, the IC unit 500, and the compensation unit 140 described above, respectively.

The active compensation device 100B may sense the noise current $I_n$ input in a CM to each of two high-current paths connected to the first device 300, and actively compensate for the noise current $I_n$ with a compensation current $I_{inj}$.

The sensing transformer 120B may have, for example, a structure in which a primary side wire and a secondary side wire pass through one core or are wound around one core at least once. The primary side wire of the sensing transformer 120B may correspond to a power line that is a high-current path, and the secondary side wire of the sensing transformer 120B may be connected to an input terminal of the IC unit 500. In an embodiment, the volume of the sensing transformer 120B may be minimized by passing the primary side wire and the secondary side wire through the core instead of the CM choke, or by winding the primary side wire and the secondary side wire around the core at least once.

An output signal of the sensing unit 120B may be proportional to the magnitude of the noise current $I_n$.

The output signal of the sensing unit 120B may be input to the IC unit 500. As described above, the IC unit 500 may convert the output signal into a digital signal, generate and output noise data S2 based on the digital signal, and output a compensation signal (or an amplification signal) S1 based on the digital signal.

The noise data S2 may be stored in a data storage external to the active compensation device 100B, and utilized.

The compensation signal S1 may be input to the compensation unit 140B. In the present embodiment, the compensation unit 140B may include a compensation transformer and a compensation capacitor unit.

The primary side of the compensation transformer may be connected to the output terminal of the IC unit 500, and the secondary side of the compensation transformer may be connected to a high current path. The compensation transformer may generate, in the secondary side, the compensation current Iinj to be injected into the high-current path, based on the amplified current (i.e., the compensation signal S1) flowing in the primary side, while insulating the IC unit 500 from the high-current path.

The secondary side of the compensation transformer may be arranged on a path connecting the compensation capacitor unit to a reference potential. That is, one end of the secondary side may be connected to the high-current path through the compensation capacitor unit, and the other end of the secondary side may be connected to the reference potential of the active compensation device 100B.

The current (i.e., a secondary side current) $I_{inj}$ obtained through conversion by the compensation transformer may be injected into or drawn out of the high-current path through the compensation capacitor unit, as a compensation current. As such, the compensation capacitor unit may provide a path through which the current generated in the secondary side of the compensation transformer flows to each high current. In this way, the active compensation device 100B may reduce EMI noise.

The compensation capacitor unit may include two Y-capacitors (Y-caps) having one ends connected to the secondary side of the compensation transformer and the other ends connected to the high-current path.

The active compensation device 100B described above is an example of a feedforward current sensing current compensating (CSCC) type that senses the noise currents $I_n$ and compensates for the noise currents $I_n$ with the compensation current $I_{inj}$ at a front end thereof, which is a power source side.

Figure 10:
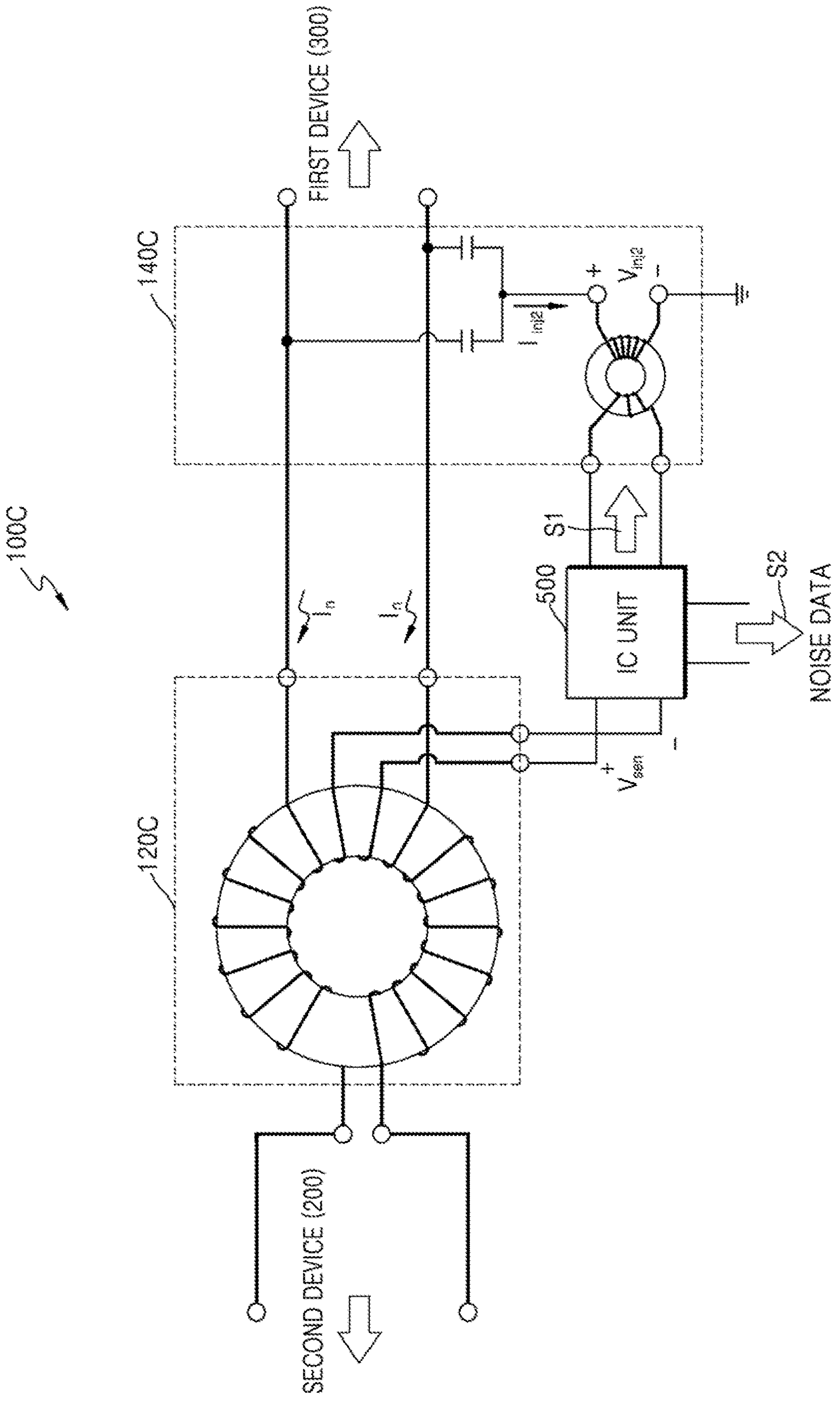
FIG. 10 schematically illustrates an active compensation device 100C according to another embodiment of the present disclosure.

FIG. 10 schematically illustrates an active compensation device 100C according to another embodiment of the present disclosure. For convenience, the third device 400 is omitted.

The active compensation device 100C may sense the noise current $I_n$ input in a CM to each of two high-current paths connected to the first device 300, and actively compensate for the noise currents $I_n$ with a compensation current $I_{inj2}$.

Referring to FIG. 10, the active compensation device 100C may include a sensing unit 120C, the IC unit 500, and a compensation unit 140C. The compensation unit 140C may include a compensation transformer and a compensation capacitor unit.

The sensing unit 120C corresponds to the sensing unit 120A-1 described above with reference to FIG. 8, the IC unit 500 corresponds to the IC unit 500 described above with reference to various embodiments, and the compensation unit 140C corresponds to the compensation unit 140B described above with reference to FIG. 9, and thus, detailed descriptions thereof will be omitted.

The active compensation device 100C is an example of a feedback CSCC type that compensates for the sensed noise currents $I_n$ with the compensating current $I_{inj2}$ at a rear end thereof.

Figure 11:
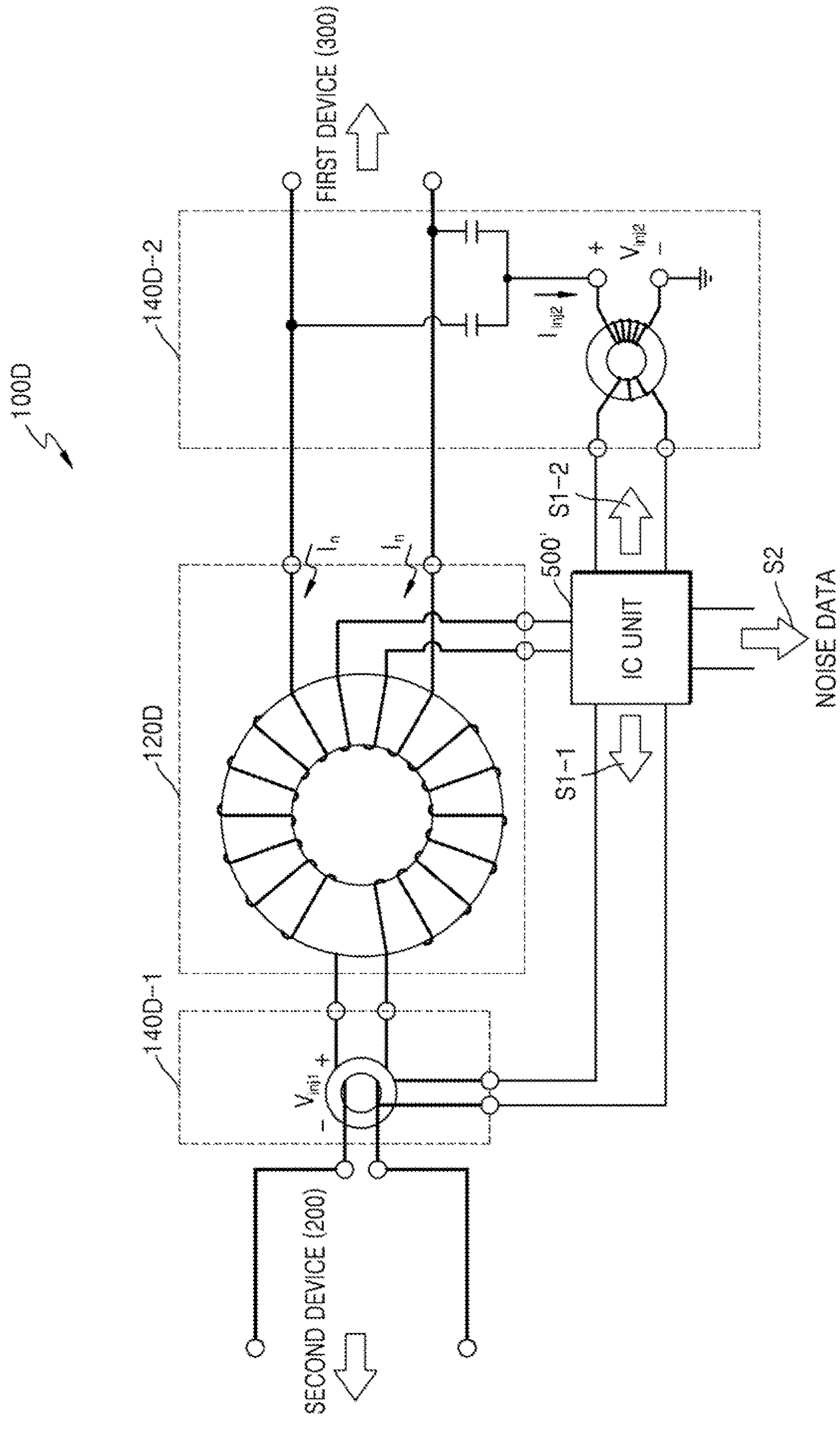
FIG. 11 schematically illustrates an active compensation device 100D according to another embodiment of the present disclosure.

FIG. 11 schematically illustrates an active compensation device 100D according to another embodiment of the present disclosure. For convenience, the third device 400 is omitted.

The active compensation device 100D may sense the noise currents $I_n$ input in a CM respectively to two high-current paths connected to the first device 300, and collectively compensate for the noise currents $I_n$ with the compensation voltage $V_{inj1}$ and the compensation current $I_{inj2}$.

Referring to FIG. 11, the active compensation device 100D may include a sensing unit 120D, an IC unit 500', a first compensation unit 140D-1, and a second compensation unit 140D-2. The second compensation unit 140D-2 may include a compensation transformer and a compensation capacitor unit.

The sensing unit 120D corresponds to the sensing unit 120A-1 described above with reference to FIG. 8, the first compensation unit 140D-1 corresponds to the compensation transformer 140A-1 described above with reference to FIG. 8, and the second compensation unit 140D-2 corresponds to the compensation unit 140B described above with reference to FIG. 9, and thus, detailed descriptions thereof will be omitted.

The output signal of the sensing unit 120D may be input to the IC unit 500'. As described above, the IC unit 500' may convert the output signal into a digital signal, generate and output noise data S2 based on the digital signal, and output a first compensation signal S1-1 and a second compensation signal S1-2 based on the digital signal.

For example, the IC unit 500' may include a first amplifier that outputs a first compensation signal S1-1 from the output signal of the DAC 530, and a second amplifier that outputs a second compensation signal S1-2 from the output signal of the DAC 530. For example, the IC unit 500' may include a first-1 output terminal for outputting the first compensation signal S1-1 to the first compensation unit 140D-1, and a first-2 output terminal for outputting the second compensation signal S1-2 to the second compensation unit 140D-2. However, the present disclosure is not limited thereto.

The first compensation signal S1-1 output from the IC unit 500' may correspond to an input voltage of the first compensation unit 140D-1. The first compensation unit 140D-1 may be a compensation transformer that induces the compensation voltage $V_{inj1}$ in series on a high-current path, which is on a secondary side, based on the input voltage applied to a primary side. The compensation voltage $V_{inj1}$ generated in series on the high-current path may have an effect of suppressing the noise current $I_n$ flowing through the high-current path.

Meanwhile, the compensation transformer included in the second compensation unit 140D-2 may generate, in the secondary side, the compensation current $I_{inj2}$ to be injected into the high-current path, based on the second compensation signal S1-2 output from the IC unit 500'. The current (i.e., a secondary side current) $I_{inj2}$ obtained through conversion by the compensation transformer may be injected into or drawn out of the high-current path through the compensation capacitor unit, as a compensation current.

In an embodiment, the first compensation unit 140D-1 may be arranged in the front of the sensing unit 120D, and the second compensation unit 140D-2 may be arranged in the rear of the sensing unit 120D. For example, the first compensation unit 140D-1 may perform voltage compensation and the second compensation unit 140D-2 may perform current compensation, at the same time. According to this embodiment, it is possible to simultaneously compensate for a CM voltage and current and thus effectively reduce noise.

Figure 12:
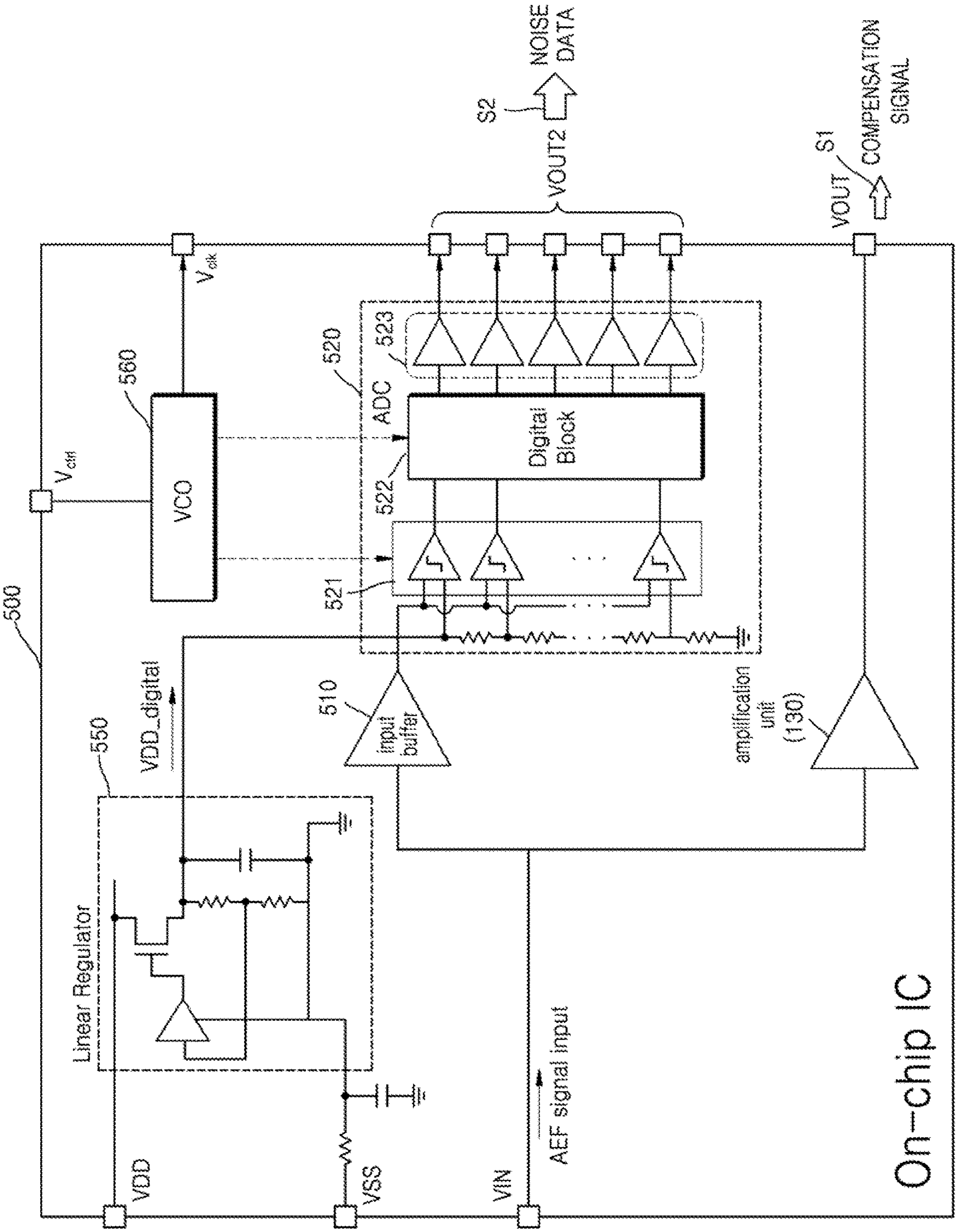
FIG. 12 illustrates a detailed example of an integrated circuit (IC) unit 500, according to another embodiment of the present disclosure.

FIG. 12 illustrates a detailed example of the IC unit 500, according to another embodiment of the present disclosure.

Referring to FIG. 12, the IC unit 500 according to an embodiment of the present disclosure may include an amplifier 130 and a digital circuit unit 501. The digital circuit unit 501 may convert an analog signal, which is an input signal of the IC unit 500, into the digital noise data S2, and may include an input buffer 510 and an analog-to-digital converter 520.

The IC unit 500 may further include a linear regulator 550 and a voltage controlled oscillator (VCO) 560. The linear regulator 550 may generate a direct current (DC) low voltage for driving active elements inside the IC unit 500. The VCO 560 may generate a clock signal for controlling an internal circuit of the analog-to-digital converter 540.

The IC unit 500 may be physically a single IC chip. According to the present embodiment, the digital noise data S2 and the compensation signal S1 as described above may be generated from one IC chip. In other words, a component (e.g., the digital circuit unit 501) for generating the noise data S2 and the amplifier 130 for generating the compensation signal S1 may be implemented on one IC chip. However, this is only an embodiment, and in another embodiment, a component for generating noise data and a component for generating a compensation signal may be implemented on one or more different chips or packages.

The IC unit 500 may include an input terminal VIN for receiving an output signal of the sensing unit 120, a first output terminal VOUT for outputting the compensation signal S1, and second output terminals VOUT2 for outputting the digital noise data S2.

As described above, the sensing unit 120 may sense a noise signal ($I_n$ or $V_n$) to generate an output signal corresponding to the noise signal. An output signal output from the sensing unit 120 serves as an input signal of the IC unit 500.

The output signal of the sensing unit 120 may be input through the input terminal VIN of the IC unit 500, and then input to each of the amplifier 130 and the input buffer 510 of the digital circuit unit 501, within the IC unit 500.

The amplifier 130 may amplify an analog input signal. The amplified analog signal may be output as the compensation signal S1 through the first output terminal VOUT. The compensation signal S1 output through the first output terminal VOUT may be input to the compensation unit 140. Meanwhile, because the compensation signal S1 needs to be sufficiently large, the output voltage of the amplifier 130 may be designed to correspond to about 12 V, but the present disclosure is not limited thereto.

Meanwhile, a signal input through the input terminal VIN of the IC unit 500 is also input to the digital circuit unit 501 including the input buffer 510 and the analog-to-digital converter 520.

According to an embodiment, a noise signal input to the input buffer 510 of the digital circuit unit 501 may be a high-voltage swing of at least 10 V. Thus, for example, the input buffer 510 may be a high-swing double-diffused metal oxide semiconductor (DMOS) having a sufficient breakdown voltage and performance.

Of course, all embodiments described in this specification can be applied in combination with each other.

According to various embodiments of the present disclosure described above, it is possible to collect noise data while compensating for a noise signal by using the active compensation device 100, 100A, 100A-1, 100B, 100C, or 100D.

According to various embodiments of the present disclosure, noise data may be extracted and collected from an active compensation device, and used for various purposes. For example, noise data output from the active compensation device according to an embodiment of the present disclosure may be monitored to identify a change in state or an emergency situation. Also, the noise data may be utilized for big data processing.

That is, according to an embodiment, by extracting and/or collecting noise data as described above, it is possible to detect that an emergency situation has occurred, for example, failing of an inverter of a power-using device, and notify a manager of this accident.

Figure 13:
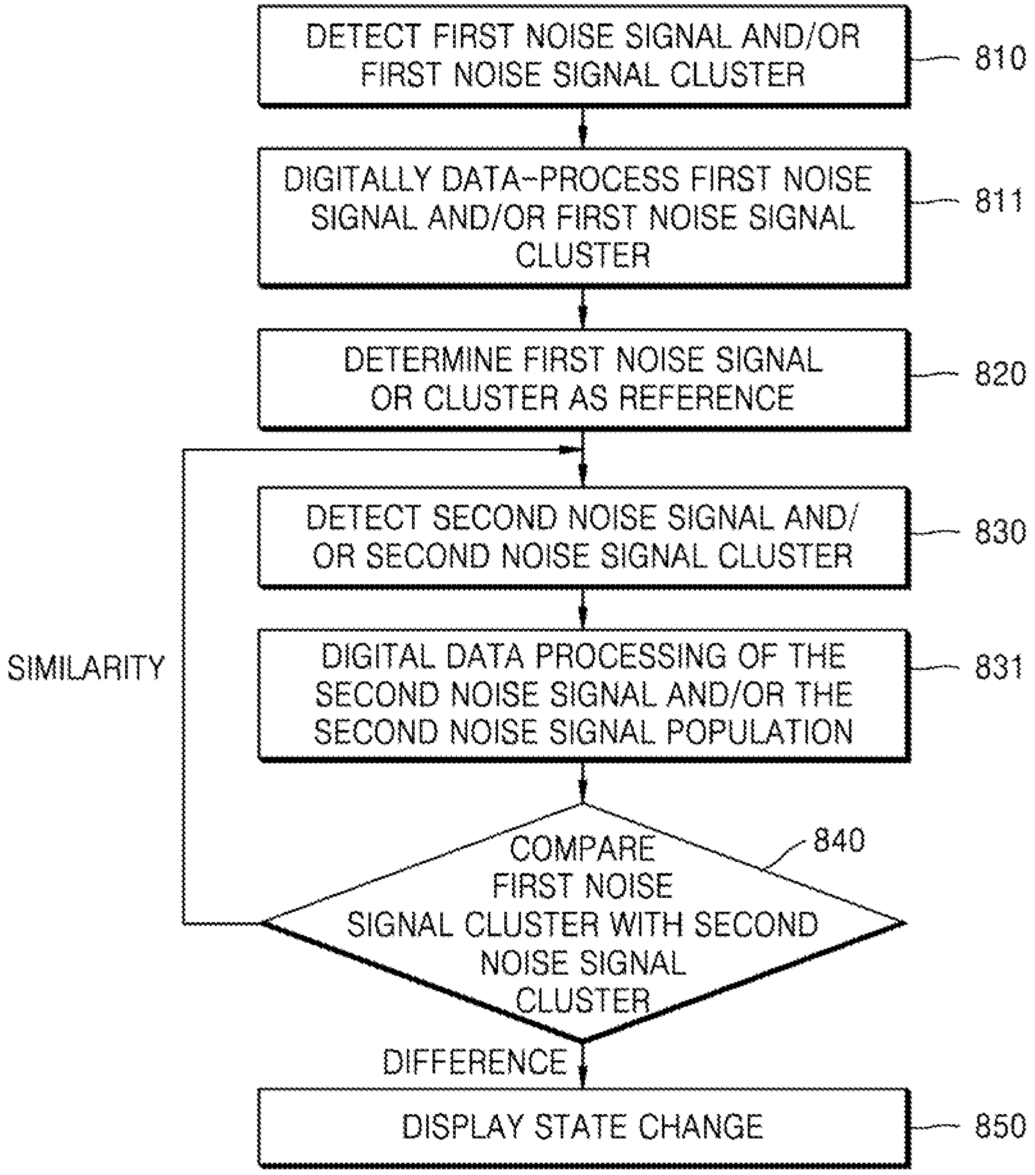
FIG. 13 shows an algorithm for an emergency situation detection method according to an embodiment.

FIG. 13 shows an algorithm for an emergency situation detection method according to an embodiment.

First, a first noise signal and/or a first noise signal cluster may be detected through the sensing unit (810). Here, the first noise signal cluster refers to a collection of first noise signals detected multiple times. For example, it may be a collection of first noise signals measured repeatedly multiple times under the same conditions.

Next, the first noise signal and/or the first noise signal cluster are digitally processed (811). Such digital data processing may be performed by the analog-to-digital converter 520 of the previous embodiments.

The first noise signal and/or first noise signal cluster which have been digitally converted, may be determined as a reference (820).

First, a second noise signal and/or a second noise signal cluster may be detected through a sensing unit (830). In this regard, the second noise signal and/or the second noise signal cluster refer to noise signals measured in a time, condition, and/or environment which are different from those for the first noise signal and/or the first noise signal cluster. For example, in the case where the first noise signal and/or the first noise signal cluster are noise signals when the inverter is operating normally, the second noise signal and/or the second noise signal cluster may correspond to noise signals in such a state that the inverter is not operating normally. The second noise signal cluster refers to a collection of first noise signals detected multiple times. For example, it may be a collection of second noise signals measured repeatedly multiple times under the same conditions.

Next, the second noise signal and/or the second noise signal cluster are digitally processed (831). Such digital data processing may be performed by the analog-to-digital converter 520 of the previous embodiments.

Thereafter, the second noise signal and/or the second noise signal cluster are compared with the first noise signal and/or the first noise signal cluster which are a reference (840).

In this regard, in the case where the second noise signal and/or the second noise signal cluster show similarity to the first noise signal and/or the first noise signal cluster within a certain range, the state in which the second noise signal and/or the second noise signal cluster are measured may be considered to be unchanged from the state in which the first noise signal and/or the first noise signal cluster are measured, and the second noise signal and/or the second noise signal cluster may be measured again at different times, conditions and/or environments. For example, the time, condition, and/or environment in which the second noise signal and/or the second noise signal cluster are measured, may be considered to be a normal situation.

In this regard, similarity within a certain range may include matching within an error range within a preset range.

When the second noise signal and/or the second noise signal cluster differ from the first noise signal and/or the first noise signal cluster within a certain range, the state in which the second noise signal and/or the second noise signal cluster are measured is considered to be changed from the state in which the first noise signal and/or the first noise signal cluster are measured, and this state change may be displayed to a user (850).

In response to this state change, the user may identify whether a malfunction has occurred or take other actions. These subsequent processes may be performed automatically in response to state changes.

As described above, according to the present disclosure, the state change or emergency situations may be monitored by using noise data output from the active compensation device, which may enable follow-up measures to be obtained.

Although the present disclosure has been described with reference to the embodiments illustrated in the drawings, they are merely exemplary, and it will be understood by one of skill in the art that various modifications and equivalent embodiments may be made therefrom. Therefore, the true technical protection scope of the present disclosure should be determined by the appended claims.

Embodiments of the present disclosure may be used in electronic devices such as household electrical appliances, industrial electrical appliances, electric vehicles, airplanes, energy storage systems, etc. However, the industrial applicability according to embodiments of the present disclosure is not limited thereto.

The invention claimed is:

1. An active compensation device for actively compensating for noise generated in a common mode on each of at least two high-current paths, the active compensation device comprising:

a sensing unit configured to generate an output signal corresponding to a common-mode noise signal on the at least two high-current paths;

an integrated circuit (IC) unit that receives the output signal and converts the output signal into a digital signal, generates noise data and an amplified signal at least based on the digital signal, and outputs the noise data and the amplified signal; and a compensation unit configured to draw a compensation current out of the at least two high-current paths or generate a compensation voltage on the at least two high-current paths, based on the amplified signal, wherein the noise data is provided to an external device.

2. The active compensation device of claim 1, wherein the IC unit restores the digital signal to an analog signal, amplifies the analog signal to generate the amplified signal, and outputs the amplified signal through a first output terminal.

3. The active compensation device of claim 1, wherein the IC unit comprises:

an analog-to-digital converter; and an input buffer configured to receive the output signal and attenuate the output signal into a low-voltage analog signal that is usable for the analog-to-digital converter.

* * * * *